UNITED STATES PATENT OFFICE.

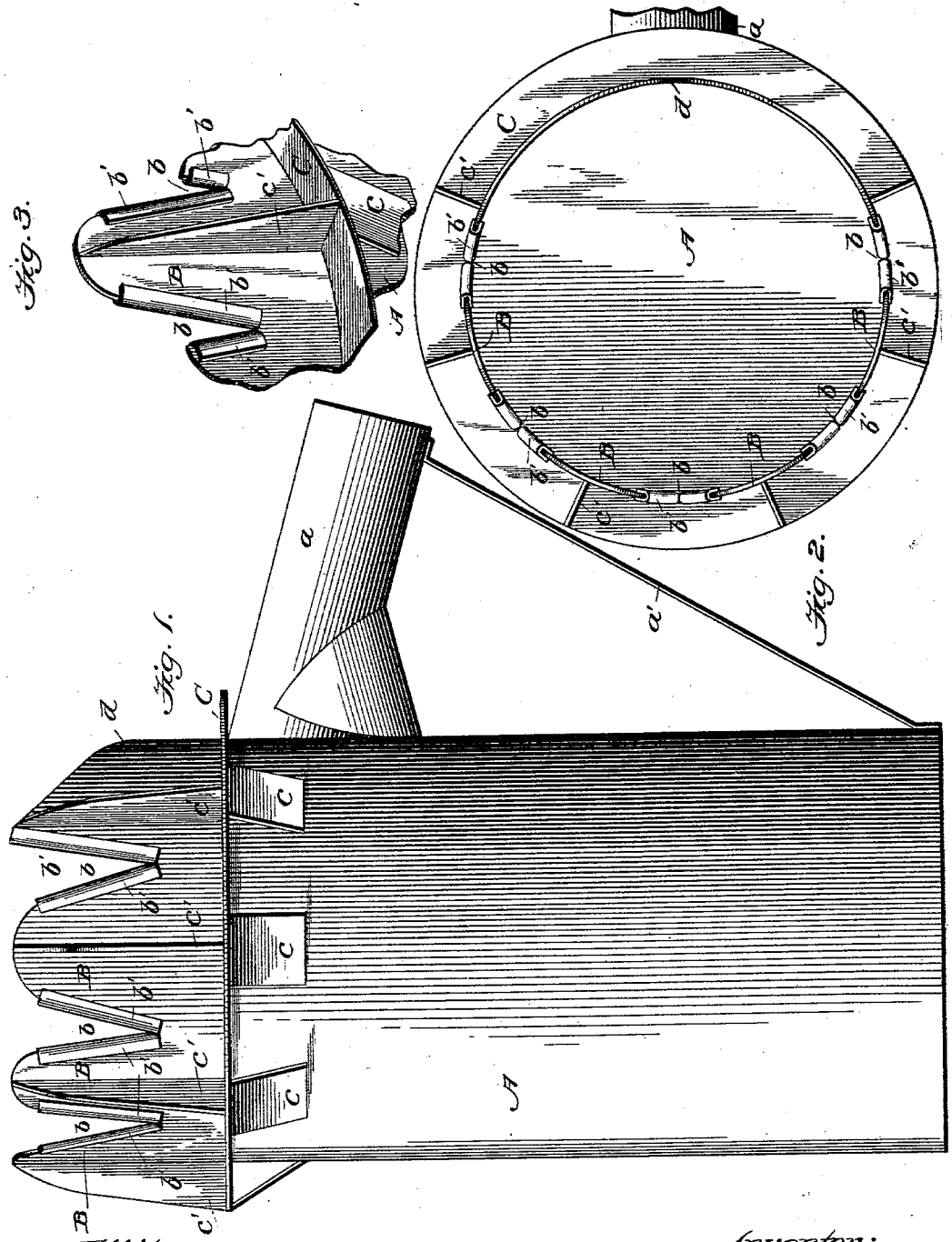

WILHELM WASMUTH, OF WARSAW, KENTUCKY.

FRUIT-GATHERER.

SPECIFICATION forming part of Letters Patent No. 477,479, dated June 21, 1892.

Application filed March 4, 1892. Serial No. 423,708. (No model.)

*To all whom it may concern:*

Be it known that I, WILHELM WASMUTH, a citizen of the United States, and a resident of Warsaw, in the county of Gallatin and State of Kentucky, have invented certain new and useful Improvements in Fruit-Gatherers; and I do hereby declare the following to be a full, clear, and exact description of the invention, such as will enable others skilled in the art to which it appertains to make and use the same.

My invention relates to improvements in fruit-gatherers; and the object is to provide a strong and simple device which is cheap of manufacture and is braced or strengthened to prevent breaking in ordinary usage.

With these ends in view the invention contemplates a suitable receptacle or bucket having a socket on one side to receive a handle and a series of V-shaped notches in its upper edge, forming a series of tapering fingers, the edges of which fingers are reinforced by strips secured thereto, an annular brace secured on the outside of said receptacle below the apices of the notches between the fingers, and which is sustained in position by suitable inclined struts, and vertical braces rigid with the annular brace and extending alongside of and secured to the fingers.

My invention consists, further, of certain details of construction and arrangements of parts, as will be hereinafter described and claimed.

To enable others to more readily understand my invention, I have illustrated the same in the accompanying drawings, in which—

Figure 1 is a side elevation of the improved fruit-gatherer. Fig. 2 is a top plan view of the device, and Fig. 3 is a detail view of a portion of the receptacle.

Referring to the drawings, in which like letters of reference denote corresponding parts in all the figures, A designates the receptacle or bucket in which the fruit is gathered, and on one side thereof is a socket $a$, secured rigidly to the receptacle and having its extreme end strengthened by a brace $a'$. This socket is arranged at an angle to the side of the receptacle, so that when the handle is inserted therein the device can be more easily operated in the manner hereinafter described.

In the upper edge of this receptacle is cut a series of V-shaped notches $b$, forming a series of tapering fingers B, which are spaced at suitable intervals and are of sufficient size to receive the stems of fruit on the tree or bush. The edges of these fingers are strengthened by reinforcing-strips $b'$, which are bent around the edges and lie on both sides of the finger and are secured thereto in any suitable manner. These strips strengthen and protect the edges of the fingers, which otherwise would be liable to bend or break when the device is used. An annular horizontal brace C is secured around the receptacle, preferably below the notches and fingers in the upper edge thereof, and it is held rigidly in position by inclined struts $c$, fastened to the receptacle beneath the brace and to the outer edge of said brace C, as shown. Vertical braces $c'$ are secured on the upper face of the annular brace C, and they extend upward at right angles to the brace and receptacle and are soldered or otherwise suitably secured to the fingers B between the notches $b$. These vertical braces serve to strengthen the fingers B, which are liable to be broken and bent out of place when the fruit is pulled off by the device.

When the improved gatherer is in use, it is manipulated to bring an apple, for example, within the receptacle, its stem resting in the apex of one of the notches. It will then require but very little pull on the device to sever the apple-stem from the branch on the tree, and the fruit will fall upon the side of the receptacle just above the socket for the handle. This breaks the fall of the fruit and prevents it from being bruised.

The upper edge of the receptacle above the handle-socket and between the end notches is concaved, as at $d$, so that the device may be brought close up to a limb.

I am aware that changes in the form and proportion of parts and details of construction of the devices herein shown and described as an embodiment of my invention can be made without departing from the spirit or sacrificing the advantages thereof, and I therefore reserve the right to make such changes as fairly fall within the scope of the same.

Having thus fully described my invention, what I claim as new, and desire to secure by Letters Patent, is—

1. A fruit-gatherer comprising a receptacle having a series of V-shaped notches forming a series of tapering fingers around its upper edge, the reinforce-strips fastened over the edges of said fingers, an annular brace on the outer side of the receptacle, and the vertical braces rigid with said annular brace and the fingers of the receptacle, substantially as described.

2. A fruit-gatherer comprising a receptacle A, a handle-socket secured thereto, at an acute angle to the side of the receptacle, a series of V-shaped notches $b$, forming a series of tapering fingers B, the reinforcing-strips $b'$, an annular brace C, secured around the receptacle below the notches and fingers, the inclined struts $c$, and the vertical braces $c'$, rigid with the annular brace C, and the tongues or fingers B at right angles thereto, substantially as described.

In testimony whereof I affix my signature in presence of two witnesses.

WILHELM WASMUTH.

Witnesses:
DAVID B. WALLACE,
JOSIAH FLACK.